United States Patent
Kitazawa

(10) Patent No.: US 10,625,609 B2
(45) Date of Patent: Apr. 21, 2020

(54) POWER CONTROL UNIT

(71) Applicant: TOYOTA JIDOSHA KABUSHIKI KAISHA, Toyota-shi, Aichi-ken (JP)

(72) Inventor: Osamu Kitazawa, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 420 days.

(21) Appl. No.: 15/115,051

(22) PCT Filed: Jan. 9, 2015

(86) PCT No.: PCT/IB2015/000013
§ 371 (c)(1),
(2) Date: Jul. 28, 2016

(87) PCT Pub. No.: WO2015/114429
PCT Pub. Date: Aug. 6, 2015

(65) Prior Publication Data
US 2016/0347190 A1    Dec. 1, 2016

(30) Foreign Application Priority Data
Jan. 31, 2014   (JP) .................. 2014-016960

(51) Int. Cl.
*B60L 11/18* (2006.01)
*B60L 11/00* (2006.01)
(Continued)

(52) U.S. Cl.
CPC .......... *B60L 11/1811* (2013.01); *B60L 50/14* (2019.02); *B60L 50/40* (2019.02); *B60L 53/20* (2019.02);
(Continued)

(58) Field of Classification Search
CPC ..... B60L 11/005; B60L 11/10; B60L 11/1811; B60L 2210/10; B60L 2210/40;
(Continued)

(56) References Cited

U.S. PATENT DOCUMENTS

2010/0072865 A1 * 3/2010 Endo ................. B60K 6/26
310/68 D
2012/0250252 A1 * 10/2012 Iguchi .............. H05K 7/20927
361/689

FOREIGN PATENT DOCUMENTS

JP    2006-094586 A    4/2006
JP    2007-174760 A    7/2007
(Continued)

OTHER PUBLICATIONS

Philip A Laplante; Comprehensive dictionary of electrical engineering, p. 190 (Year: 2005).*

*Primary Examiner* — Hal Kaplan
*Assistant Examiner* — Elim Ortiz
(74) *Attorney, Agent, or Firm* — Sughrue Mion, PLLC

(57) ABSTRACT

In a power control unit provided in this application, a reactor (38) and a DC/DC converter (step-down transformer) (24) are stacked, and a capacitor (40) is arranged next to these. The capacitor (40) is fixed at fixing points (a cradle (90) and a fixing protrusion (88)) in two locations, and is also fixed to the DC/DC converter (24) by a bus bar (104) that electrically connects a terminal (78) of the capacitor to a terminal (100) of the DC/DC converter. A fixing position by the bus bar (104) is a position away from a straight line that passes through the fixing points in two locations, which is advantageous for suppressing vibrations around this straight line.

14 Claims, 9 Drawing Sheets

(51) Int. Cl.
| | |
|---|---|
| *B60L 11/10* | (2006.01) |
| *H02M 3/155* | (2006.01) |
| *H02M 7/5387* | (2007.01) |
| *B60L 50/40* | (2019.01) |
| *B60L 53/20* | (2019.01) |
| *B60L 50/14* | (2019.01) |
| *H02K 11/33* | (2016.01) |
| *B60W 10/08* | (2006.01) |
| *B60W 20/00* | (2016.01) |
| *H02M 3/04* | (2006.01) |
| *H02M 7/537* | (2006.01) |
| *H02P 27/06* | (2006.01) |
| *H02M 1/00* | (2006.01) |

(52) U.S. Cl.
CPC ............ *B60W 10/08* (2013.01); *B60W 20/00* (2013.01); *H02K 11/33* (2016.01); *H02M 3/04* (2013.01); *H02M 3/155* (2013.01); *H02M 7/537* (2013.01); *H02M 7/5387* (2013.01); *H02P 27/06* (2013.01); *B60L 2210/10* (2013.01); *B60L 2210/40* (2013.01); *H02M 2001/007* (2013.01); *Y10S 903/906* (2013.01)

(58) Field of Classification Search
CPC ...... B60W 10/08; B60W 20/00; H02K 11/33; H02M 3/04; H02M 3/155; H02M 7/537; H02M 7/5387; H02M 2001/007; H02P 27/06; Y10S 903/906
See application file for complete search history.

(56) References Cited

FOREIGN PATENT DOCUMENTS

| | | | |
|---|---|---|---|
| JP | 2009-295632 | A | 12/2009 |
| JP | 2010187473 | A | 8/2010 |
| JP | 2010-233294 | A | 10/2010 |
| JP | 2011239485 | A | 11/2011 |
| JP | 2012-105369 | A | 5/2012 |
| JP | 2012105369 | A * | 5/2012 |
| JP | 2012217316 | A | 11/2012 |

* cited by examiner

POWER CONTROL UNIT

BACKGROUND OF THE INVENTION

1. Field of the Invention

The invention relates to a power control unit that converts direct-current (DC) power to alternating-current (AC) power and supplying this converted power to an electric motor. More particularly, the invention relates to a structure for fixing a component part of a power control unit.

2. Description of Related Art

A power control unit that is mounted in a vehicle powered partially or entirely by electricity such as a hybrid vehicle or an electric vehicle or the like, and that converts DC power from an onboard DC power supply to AC power and supplying this converted power to an electric motor for driving the vehicle is known. The power control unit includes a step-up transformer that steps up the voltage of the DC power, and a power converter that converts the stepped-up DC power to AC power. Moreover, a power control unit provided with a step-down transformer that steps down the voltage of DC power is also known. The step-up transformer includes a reactor, a capacitor, and a switching element. The reactor and capacitor of the step-up transformer, the step-down transformer, and a power converter and the like are integrated by being fixed to a common structure such as a device case within which these are housed.

This device case is arranged in a space that houses a prime mover (i.e., a so-called "engine compartment"), and there are some cases in which a reactor, capacitor, and a bus bar that connects these together, and the like that are housed in the device case will vibrate from a road surface when the vehicle is being driven, or due to vibrations from an internal combustion engine. Also, a varying magnetic field may be created by a ripple current generated by a switch operation of a switching element of the power converter or the step-up transformer, and the reactor, capacitor, and bus bar and the like may vibrate from this varying magnetic field. This vibration may be transmitted to the device case and produce noise. Japanese Patent Application Publication No. 2006-94586 (JP 2006-94586 A) describes technology for preventing resonance among the reactor, the capacitor, and the bus bar by varying the directions in which they vibrate.

The reactor and the capacitor used in the step-up transformer, as well as the step-down transformer and the like of the unit are large or heavy, so they tend to resonate easily unless they are securely fixed. In order to securely fix these devices, it is possible to increase the number of locations where they are fixed to a structure such as a device case, and strengthen the structure, but doing so may lead to an increase in size of the unit, as well as an increased number of parts.

SUMMARY OF THE INVENTION

In view of the foregoing problems, the invention provides a power control unit that securely fixes a device to a device case.

An aspect of the invention relates to a power control unit that converts direct-current power to alternating-current power and supplies the converted power to an electric motor. The power control unit is fixed inside of an onboard device case. This power control unit for a vehicle includes a step-down transformer and a step-up transformer. The step-down transformer is configured to step down voltage of the direct-current power. The step-up transformer is configured to step up voltage of the direct-current power. The step-up transformer includes a reactor and a capacitor. The reactor and the step-down transformer are fixed to the onboard device case, and the reactor and the step-down transformer are stacked. The capacitor is arranged next to at least one of the reactor or the step-down transformer, with respect to a direction in which the reactor and the step-down transformer are stacked. The capacitor and at least one of the step-down transformer or the reactor are fixed together by a bus bar. The bus bar is configured to electrically connect a terminal of the capacitor to a terminal of at least one of the step-down transformer or the reactor.

Also, in the power control unit, the capacitor may be fixed to the onboard device case at fixing points in two locations. At this time, the bus bar may fix the capacitor to at least one of the step-down transformer or the reactor at a position away from a straight line that passes through the fixing points in two locations in a stacking direction.

Also, in the power control unit, a position where the capacitor is fixed by the bus bar may be on a side opposite a side where the fixing points are positioned, in the stacking direction.

Also, in the power control unit, the bus bar may extend in a direction that intersects a direction in which the straight line extends. The straight line may pass through the fixing points in two locations of the capacitor.

Also, in the power control unit, the capacitor may be fixed to the onboard device case at fixing points in three or more locations. Also, the onboard device case may include a partition wall that divides a space inside the device case. An opening may be provided in the partition wall, and the capacitor may pass through the opening. At this time, at least one of the step-down transformer and the reactor may be fixed to a partition wall.

Also, in the power control unit, the step-down transformer and the reactor may be fixed to a front and a back, respectively, of the partition wall.

Also, in the power control unit, the bus bar may fix at least one of the step-down transformer or the reactor to the capacitor. The step-down transformer and the reactor are fixed to the partition wall to the capacitor.

Moreover, in the power control unit, the terminal of the capacitor and the terminal of the step-down transformer each include a positive terminal and a negative terminal. Also, the bus bar may include a positive bus bar and a negative bus bar. The bus bar may connect the capacitor to the step-down transformer. The positive bus bar may connect the positive terminals together. The negative bus bar may connect the negative terminals together.

Also, in the power control unit, the capacitor may include a capacitor element. The capacitor element may include two electrode plates. An insulation member may be stacked between the two electrode plates. The two electrode plates may be rolled into a roll shape. Also, a surface of the capacitor element may be arranged facing the step-down transformer and the reactor. The surface of the capacitor element may be parallel to an axis of the roll of the electrode plates Also, in the power control unit, a wire extending from the capacitor element to the terminal of the capacitor may be arranged obliquely at an angle with respect to the axis of the roll of the electrode plates.

Also, in the power control unit, the capacitor may include a capacitor element. The capacitor element may include two electrode plates. An insulation member may be stacked between the two electrode plates. The two electrode plates may be rolled into a roll shape. Also, a surface of the capacitor element may be arranged facing the step-down transformer and the reactor. The surface of the capacitor element may be orthogonal to an axis of the roll of electrode plates. Furthermore, at this time, a wire extending from the capacitor element to the terminal of the capacitor may be arranged obliquely at an angle with respect to the axis of the roll of the electrode plates.

Here, the capacitor in the power control unit may include a capacitor element that includes two electrode plates that are stacked with an insulation member therebetween and rolled into a roll shape, and a pair of terminals arranged one on a first end and the other on a second end in the stacking direction of the step-down transformer and the reactor. Furthermore, this capacitor may include i) two first wires, each of which extends from the first end of the capacitor element in a direction along the axis of the roll of the electrode plates toward one terminal of each of the pair of terminals arranged on the first end and the second end of the capacitor, and ii) two second wires, each of which extends from the second end of the capacitor element in the direction along the axis of the roll toward one more terminal of each of the pair of terminals arranged on the first end and the second end of the capacitor. Also, the first wires and the second wires may be arranged at an angle with respect to the axis of the roll, on a surface arranged facing the step-down transformer and the reactor.

As described above, with the power control unit, it is possible to suppress vibration of the power control unit without increasing the size or number of parts of the power control unit, by fixing a capacitor and at least one of a step-down transformer or a reactor together.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
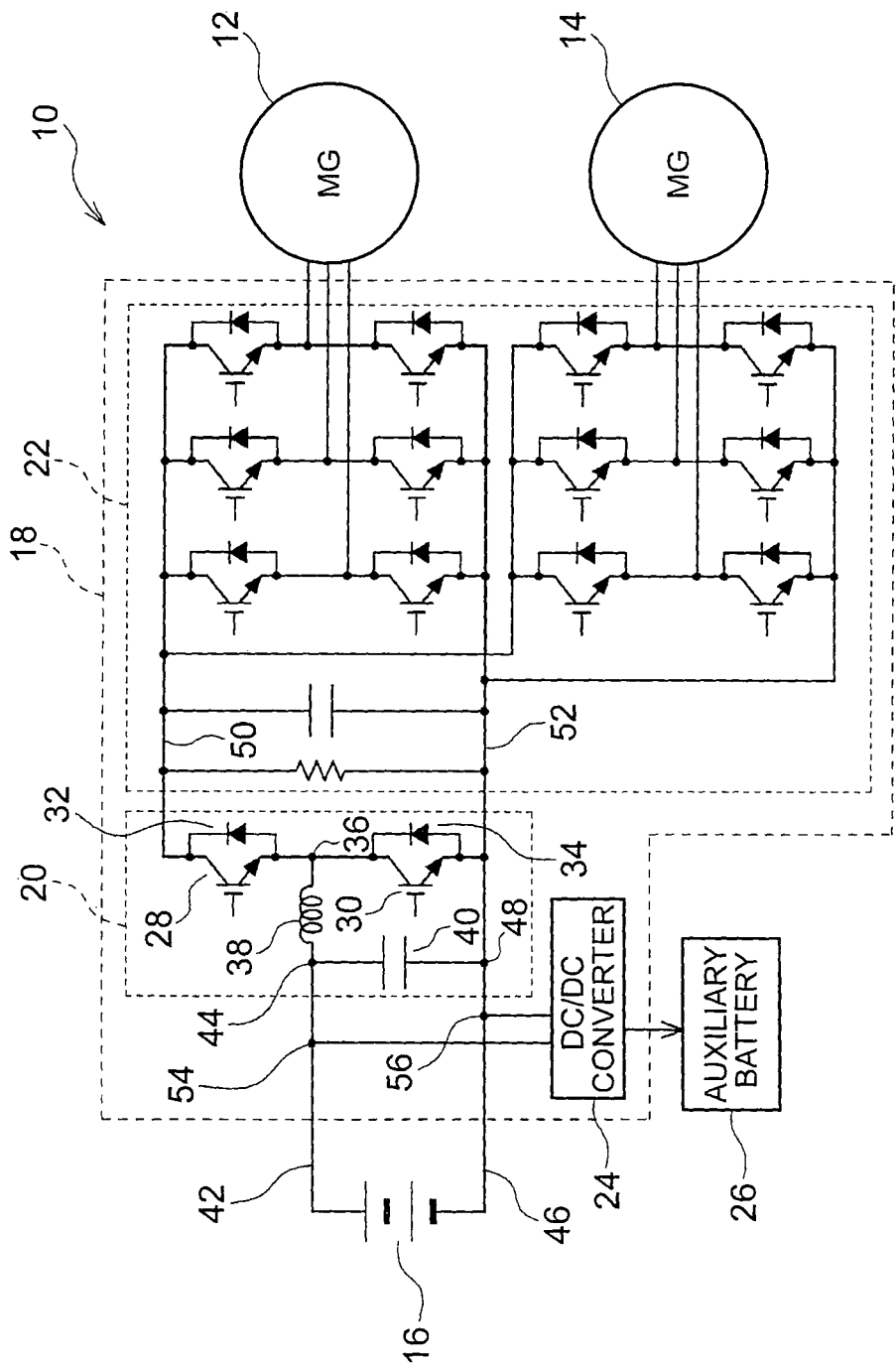
FIG. 1 is a circuit diagram of a schematic structure of a power control unit according to one example embodiment of the invention.

Hereinafter, example embodiments of the invention will be described with reference to the accompanying drawings. FIG. 1 is a circuit diagram of the schematic structure of an electric drive system 10 of a hybrid vehicle. This hybrid vehicle is provided with two electric motors 12 and 14, and an internal combustion engine, not shown, as prime movers for driving the vehicle. The vehicle is driven using these three prime movers in cooperation. The electric drive system 10 has a driving battery 16 that is a direct-current (DC) power supply, and a power control unit 18 that converts direct-current (DC) power from the driving battery 16 into alternating-current (AC) power and supplies this converted power to the electric motors 12 and 14.

The power control unit 18 is provided with a step-up transformer 20 that steps up the voltage of the DC power, a power converter 22 that converts the stepped-up power to AC power, and a DC/DC converter 24 as a step-down transformer that steps down the voltage of the DC power. DC power that has been stepped down by the DC/DC converter 24 is used to charge an auxiliary battery 26. The auxiliary battery 26 supplies power to lighting fixtures and electronic equipment and the like of the vehicle. The voltage supplied to the lighting fixtures and onboard electrical equipment is typically 12 volts, and the terminal voltage of the auxiliary battery 26 is also 12 volts. This voltage is smaller than the terminal voltage of the driving battery 16, and the voltage of the driving battery 16 is stepped down by the DC/DC converter 24 and then supplied to the auxiliary battery 26.

The step-up transformer 20 includes two switching elements 28 and 30 that are connected in series, diodes 32 and 34 that are connected in parallel to the switching elements 28 and 30, respectively, a reactor 38, and a capacitor 40. Power transistors such as IGBTs or the like are able to be used for the switching elements 28 and 30. One end of the reactor 38 is connected to a positive line 42 that is connected to a positive terminal of the driving battery 16, and the other end of the reactor 38 is connected to a connection point 36 of the two switching elements 28 and 30. One end of the capacitor 40 is connected to a connection point 44 on the positive line 42, and the other end of the capacitor 40 is connected to a connection point 48 on a negative line 46 that is connected to a negative terminal of the driving battery 16.

The DC power from the driving battery 16 is stepped up by the step-up transformer 20 and supplied to the power converter 22. The power converter 22 includes an inverter provided corresponding to each of the two electric motors 12 and 14, and converts the stepped-up DC power to three-phase AC power, which it then supplies to the electric motors 12 and 14. Also, when the electric motors 12 and 14 are made to function as generators, the generated AC power is converted to DC power by the power converter and stored in the driving battery 16.

Figure 2:
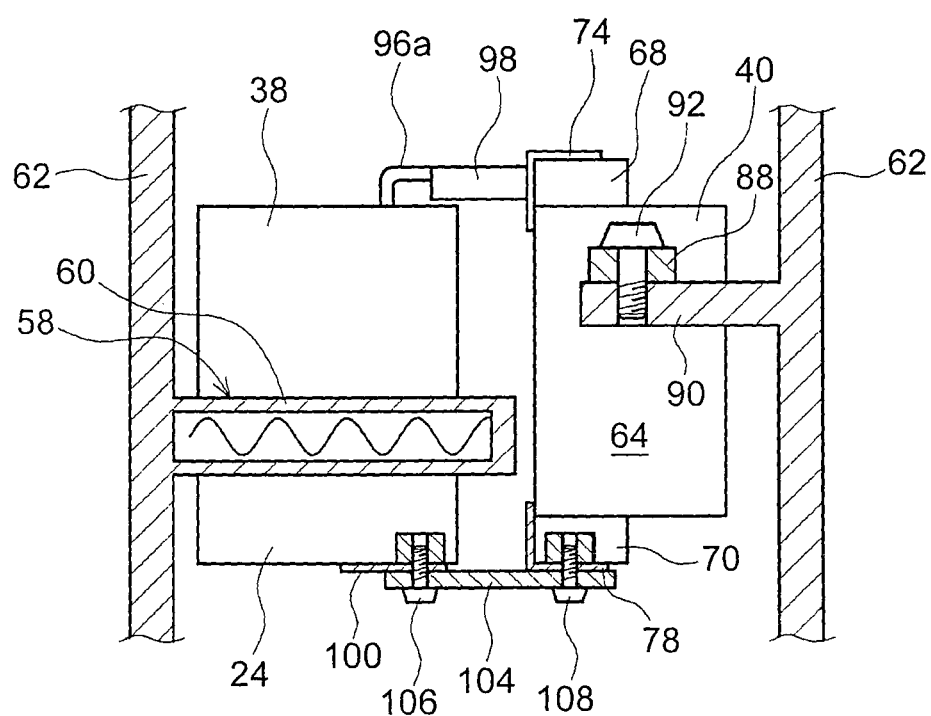
FIG. 2 is a view of an example arrangement of a reactor and a capacitor of a step-up transformer, and a step-down transformer, of the power control unit shown in FIG. 1.

FIG. 2 is a view of a specific arrangement of the reactor 38 and the capacitor 40 of the step-up transformer 20. The reactor 38 and the DC/DC converter 24 are stacked sandwiching a cooler 58, and are fixed to the cooler 58. The direction in which the reactor 38 and the DC/DC converter 24 are stacked is the vertical direction in FIG. 2. The cooler 58 has a cooler case 60, and a flow path for coolant is formed in a space therein. Coolant is supplied from a supply line, not shown, into the space inside the cooler case 60. This coolant is then discharged through a discharge line, not shown, from the internal space. The cooler case 60 is cooled by this coolant, so the reactor 38 and the DC/DC converter 24 that contact the cooler case 60 are also cooled. The cooler case 60 may also be integrally formed with a component of an onboard device case 62 within which the power control unit 18 is housed. Also, the cooler case 60 may be formed as a separate component.

The device case 62 is mounted in the vehicle, and is preferably fixed in a predetermined position inside a prime mover compartment, not shown. The prime mover compartment is a space for housing a prime mover of the vehicle, and corresponds to a space referred to as the engine compartment in a conventional vehicle equipped with an internal combustion engine. The device case 62 may be fixed to a frame of a vehicle body. The device case 62 houses several constituent elements of the power control unit 18, such as the step-up transformer 20 and the DC/DC converter 24. The housed constituent elements may be fixed to the device case 62, and as a result, the positional relationship of the fixed constituent elements is defined. The cooler case 60 that is integrated with the device case 62 also functions, together with the device case 62, as a structure that defines the positional relationship of the housed constituent elements, and may be regarded as a portion of the device case. The capacitor 40 is arranged next to, i.e., to the right in FIG. 2 of, the reactor 38 and the DC/DC converter 24. The capacitor 40 is also fixed to the device case 62. Therefore, the device case 62 that includes the cooler case 60 defines the positional relationship of the capacitor 40, and the reactor 38 and the DC/DC converter 24.

Figure 3:
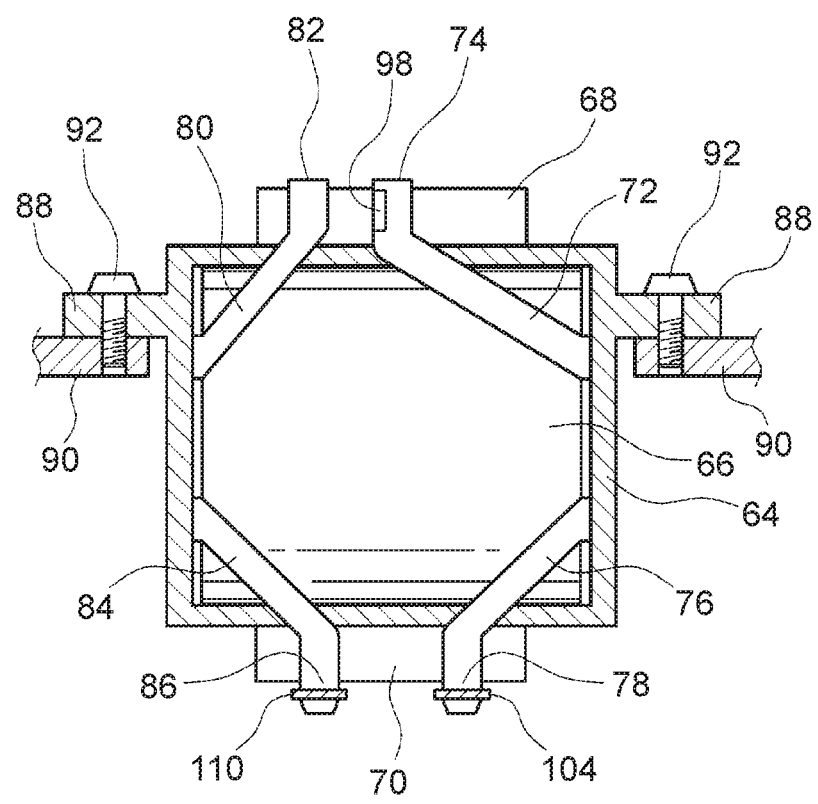
FIG. 3 is a partially fractured sectional view of an example of a schematic structure, of the capacitor of the power control unit shown in FIG. 1.
Figure 4:
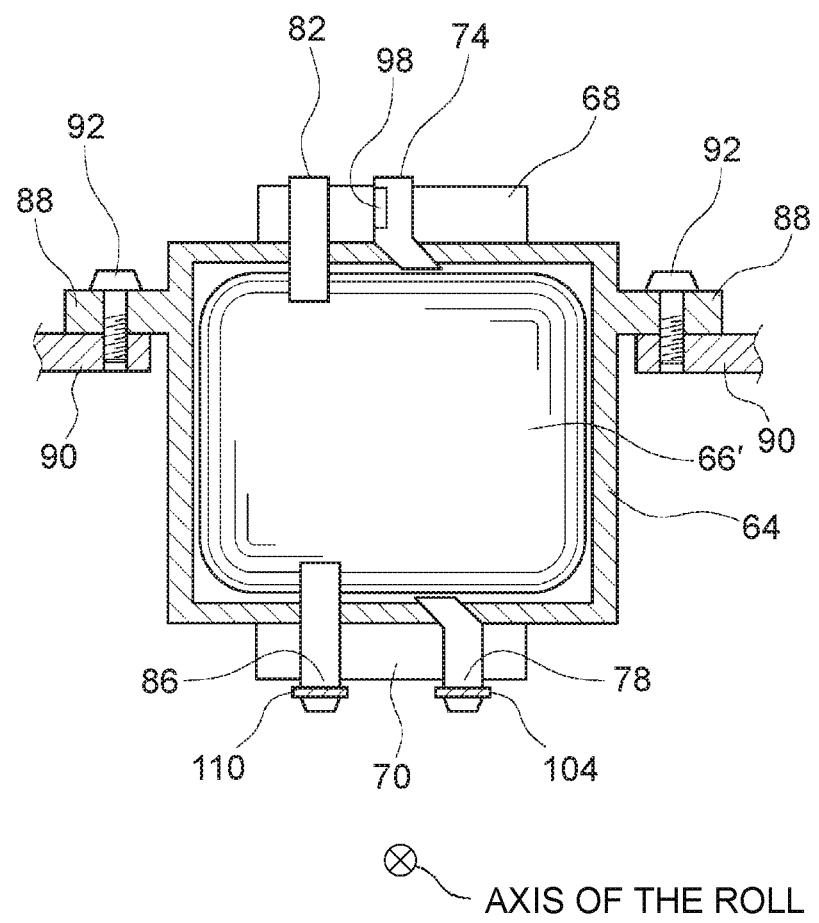
FIG. 4 is a partially fractured sectional view of another example of a schematic structure of the capacitor, as a first modified example of the example embodiment.

The capacitor 40 will now be described with reference to FIGS. 2 and 3. FIG. 3 is a view of the capacitor 40 from the left in FIG. 2. In FIG. 3, a capacitor case 64 is shown fractured so that a capacitor element 66 inside is visible. The capacitor element 66 has a structure in which two electrode plates sandwiching an insulating member are rolled up. This capacitor element 66 is housed inside the capacitor case 64 in a manner in which the axis of this roll extends in the left-right direction. The direction in which the axis of this roll extends is a direction orthogonal to the direction in which the DC/DC converter 24 and the reactor 38 are stacked, and orthogonal to a direction that the DC/DC converter 24 and the reactor 38 and the capacitor 40 face. Also, a surface of the capacitor element 66 that is parallel to the axis of the roll faces the DC/DC converter 24 and the reactor 38. The capacitor element 66 may also be housed inside the capacitor case 64 with the axis of the roll in another orientation. For example, as with the capacitor shown in FIG. 4 as a first modified example of the example embodiment, a capacitor element 66' may be housed in the capacitor case 64 with the axis of the roll being in a direction along the direction that the DC/DC converter 24, the reactor 38, and the capacitor 40 face. In this first modified example shown in FIG. 4, the axis of the roll of the electrode plates extends in a direction orthogonal to the paper on which FIG. 4 is drawn.

Returning to FIG. 3, two wires each extend from both side ends of the capacitor element 66 toward a first terminal block 68 and a second terminal block 70, in a manner cutting diagonally across the corners of the capacitor element 66, in the direction of the axis of the roll, as shown in FIG. 3. A first positive wire 72 extends from a positive plate of the capacitor element 66 toward the first terminal block 68, with an end of this first positive wire 72 forming a first positive terminal 74 on the first terminal block 68. A second positive wire 76 also extends from the positive plate toward the second terminal block 70, with an end of this second positive wire 76 forming a second positive terminal 78 on the second terminal block 70. Meanwhile, a first negative wire 80 extends from a negative plate of the capacitor element 66 toward the first terminal block 68, with an end of this first negative wire 80 forming a first negative terminal 82 on the first terminal block 68. A second negative wire 84 also extends from the negative plate toward the second terminal block 70, with an end of this second negative wire 84 forming a second negative terminal 86 on the second terminal block 70. These four wires 72, 76, 80, and 84 extend obliquely at angles to the axis of the roll, from substantially the center portion, in the vertical direction in FIG. 3, of both end sides in the axial direction of the roll of the capacitor element 66, toward the first terminal block 68 on the upper side or the second terminal block 70 on the lower side. The four wires 72, 76, 80, and 84 are able to be made shorter by having the axis of the roll of the capacitor element 66 be sideways.

Figure 5:
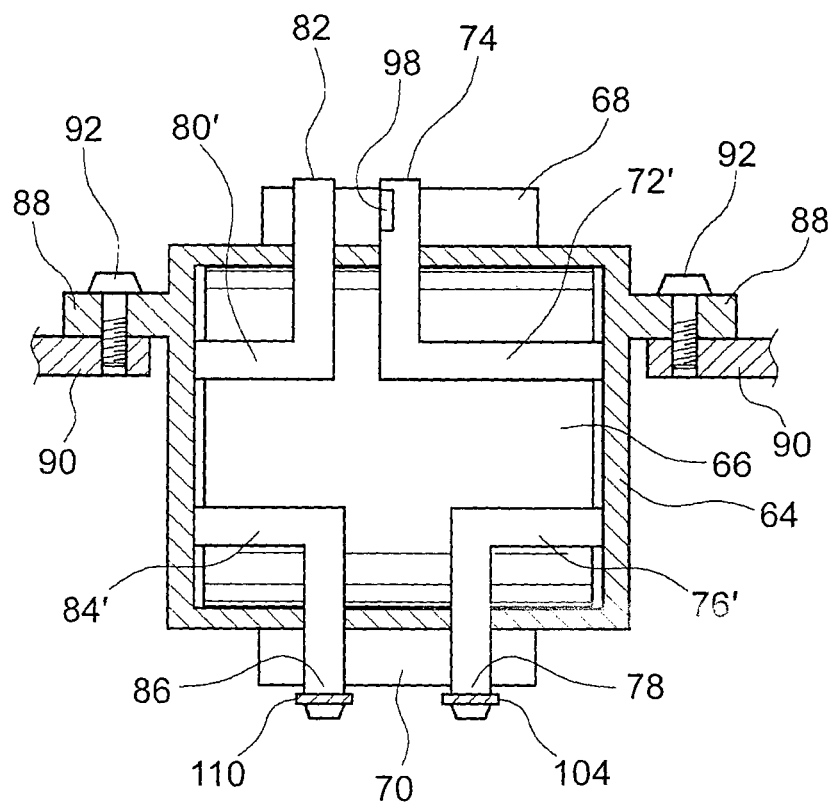
FIG. 5 is a partially fractured sectional view of yet another example of a schematic structure of the capacitor, as a second modified example of the example embodiment.

As a second modified example of the example embodiment, the wires may be longer, but arranged as shown in FIG. 5. Four wires 72', 76', 80', and 84' shown in FIG. 5 correspond to the wires 72, 76, 80, and 84, respectively, shown in FIG. 3, and have the same functions. The only difference is the shape. The four wires 72', 76', 80', and 84' are formed by portions that extend in the direction of the axis of the roll of the electrode plates, and portions orthogonal to these portions. The length of the wires is able to be shorter by arranging the wires as shown in FIG. 3, compared to the wires shown in FIG. 5.

The capacitor 40 has a pair of fixing protrusions 88 on a side surface of the capacitor case 64. The fixing protrusions 88 are provided one on each of the left and right side surfaces, in FIG. 3. These fixing protrusions 88 are arranged on a cradle 90 provided on the device case 62, and are fixed by fastening elements such as threaded bolts 92 through holes provided in the fixing protrusions 88. Screw holes are provided in the cradle 90, and the capacitor 40 is fixed to the device case 62 by the threaded bolts 92 being screwed into these screw holes. Hereinafter, positions where the fixing protrusions 88 are received by the cradle 90 will be referred to as "fixing points". In this example, the capacitor 40 is directly fixed to the device case 62.

As shown in FIGS. 2 and 3, the fixing protrusions 88 are provided toward the reactor 38 side, in the stacking direction of the reactor 38 and the DC/DC converter 24. When the capacitor 40 vibrates, the area near the fixing protrusions 88 does not move much, and the amplitude increases on the side away from the fixing protrusions 88, i.e., at the end on the DC/DC converter 24 side. Also, if a fixing protrusion is provided on the side near the DC/DC converter in the stacking direction due to the layout of the peripheral constituent elements, the amplitude will increase at the end on the reactor side. A method to suppress these vibrations will be described later.

Figure 6:
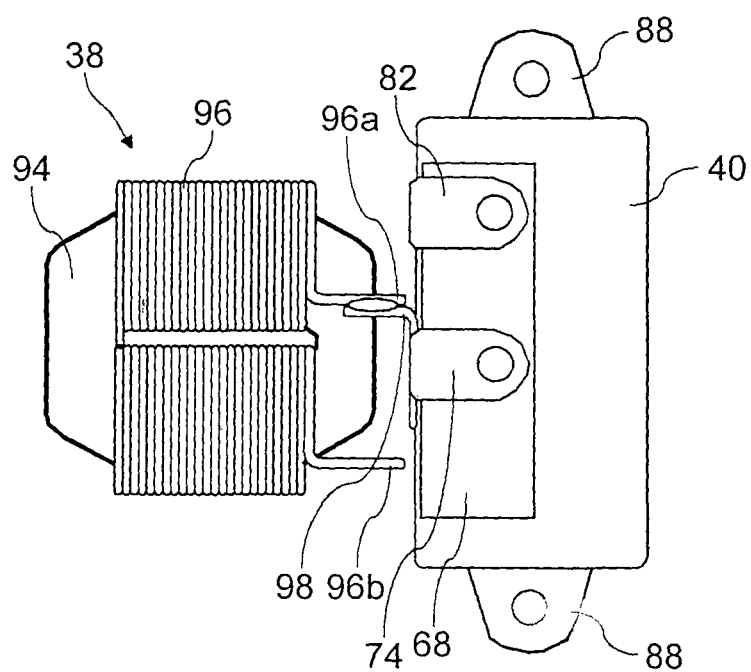
FIG. 6 is a view showing a manner of connection between the capacitor and the reactor shown in FIG. 1.

FIG. 6 is a view of a specific structure for electrically connecting the capacitor 40 to the reactor 38, and is a view of a state in which FIG. 2 is viewed from above. In FIG. 6, a core 94 and a winding 96 that is wound around the core 94 are shown as the reactor 38. The first positive wire 72 includes a branch bus bar 98 that branches off from a portion extending to the first positive terminal 74. The branch bus bar 98 is a flat plate-like wire that extends from the capacitor 40, e.g., from the position of the first terminal block 68, toward the reactor 38. One end 96a of the winding 96 of the reactor is connected to this branch bus bar 98 by welding or brazing. Also, the first positive terminal 74 is connected to the positive line 42 shown in FIG. 1. The connection point 44 shown in FIG. 1 is formed by the positive line 42 and the one end 96a of the winding of the reactor being connected to the first positive terminal 74. Although not shown in FIG. 6, the other end 96b of the winding 96 is connected to the connection point 36 of the two switching elements 28 and 30. The first negative terminal 82 is connected to the negative line 46 so as to form the connection point 48 shown in FIG. 1.

Figure 7:
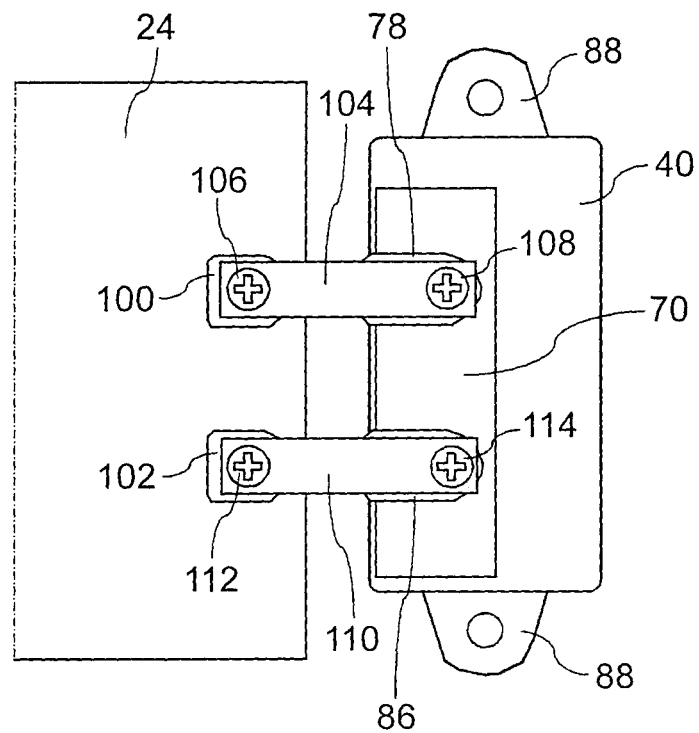
FIG. 7 is a view showing a manner of connection between the capacitor and the step-down transformer shown in FIG. 1.

FIG. 7 is a view of a specific structure for electrically connecting the capacitor 40 to the DC/DC converter 24, and shows a state in which FIG. 2 is viewed from above. The connection between the capacitor 40 and the DC/DC converter 24 will now be described with reference to FIGS. 2 and 7. Terminals of the positive electrode and the negative electrode are formed on a lower surface of the DC/DC converter 24 in FIG. 2. These terminals will be denoted as "converter positive terminal 100" and "converter negative terminal 102". A positive bus bar 104 extends between the converter positive terminal 100 and the second positive terminal 78. A screw hole is formed in the position of the converter positive terminal 100 of the DC/DC converter 24, and in the position of the second positive terminal 78 of the second terminal block 70. Threaded fastening elements such as screws 106 and 108 that pass through holes formed in the positive bus bar are screwed into these screw holes, such that the positive bus bar 104 is fixed. Similarly, a negative bus bar 110 extends between the converter negative terminal 102 and the second negative terminal 86. A screw hole is formed in the position of the converter negative terminal 102 of the DC/DC converter 24, and in the position of the second negative terminal 86 of the second terminal block 70. Threaded fastening elements such as screws 112 and 114 that pass through holes formed in the negative bus bar are screwed into these screw holes, such that the negative bus bar 110 is fixed.

Here, aside from screws, the fastening elements that fix the positive and negative bus bars 104 and 110 may also be threaded bolts such as hexagon bolts or hexagon socket bolts. Also, a combination of a stud bolt and nut may also be used. The connection at a connection point 54 in FIG. 1 is achieved by the converter positive terminal 100 being connected to the second positive terminal 78 of the capacitor. Also, the connection at a connection point 56 in FIG. 1 is achieved by the converter negative terminal 102 being connected to the second negative terminal 86 of the capacitor. The positive bus bar 104 may also be fixed by welding to one or both of the second positive terminal 78 of the capacitor and the converter positive terminal 100. Also, the negative bus bar 110 may also be fixed to one or both of the second negative terminal 86 of the capacitor and the converter negative terminal 102 by welding.

The positive bus bar 104 and the negative bus bar 110 are each made of a flat plate-like conductor plate, more specifically, a metal plate made of copper or the like, and the thickness may be 1 to 2 mm, for example. The positive and negative bus bars 104 and 110 are rigid bodies, and are able to fix the end portion of the capacitor 40 that is away from the fixing protrusions 88 to the DC/DC converter 24. As described above, the DC/DC converter 24 is fixed to the device case 62, so a lower portion of the capacitor 40 in FIG. 2 is fixed to the device case 62 indirectly by the positive bus bar 104 and the negative bus bar 110.

As described above, the capacitor 40 is fixed at two fixing points by the cradle 90. When the capacitor 40 is fixed at only these fixing points, vibration of the capacitor 40 around a straight line that passes through these two points may not be able to be sufficiently suppressed. This straight line that is the axis of the vibration will hereinafter be referred to as the "oscillation axis". Even if the capacitor 40 is fixed to the device case 62 at a plurality of points, vibration may not be able to be sufficiently suppressed if these fixing points are on or near a single straight line.

In this example embodiment, an upper end portion of the capacitor 40 may be fixed by the cradle 90, and a lower end portion of the capacitor 40 on the opposite side of the upper end portion of the capacitor 40 may be fixed to the DC/DC converter 24. That is, the capacitor 40 may be fixed in a position away from the oscillation axis, by the positive bus bar 104 and the negative bus bar 110, so vibration around the oscillation axis of the capacitor 40 is able to be suppressed. Also, the upper end portion of the capacitor 40 where the first positive terminal 74 is arranged is able to be fixed by the cradle 90, so the positioning accuracy of the terminal is able to be improved. The positive bus bar 104 and the negative bus bar 110 are able to have a generally linear shape, and the rigidity of the bus bar is able to be increased against vibrations around the oscillation axis by making the direction in which these extend be a direction that intersects with the oscillation axis, or more specifically, a direction that is orthogonal to the oscillation axis, which is preferable. The rigidity may also be increased by making the sectional shape that is orthogonal to the length direction of the positive bus bar 104 and the negative bus bar 110 an L-shape or a U-shape. Also, in this example embodiment, the capacitor 40 and the DC/DC converter 24 are connected by the two bus bars 104 and 110. However, only one of the two may be a bus bar, while the other is a flexible member such as a conducting wire, and only one bus bar may be used to fix the capacitor 40.

As described above, the winding 96 of the reactor and the branch bus bar 98 on the capacitor side are fixed by welding or the like. When these are welded, the end 96a of the winding is preferably positioned close to the branch bus bar 98, so positioning accuracy of the upper portion of the capacitor 40 that is near the weld position is required. The branch bus bar 98 is able to easily be accurately positioned near the one end 96a of the winding by providing the fixing location of the capacitor 40 with respect to the device case 62 in a position near the weld position. At this time, fixing the lower portion of the capacitor to the DC/DC converter 24 makes it possible to increase the distance between the oscillation axis and a fixing position that is not on the oscillation axis, thus enabling a greater vibration suppression effect to be displayed.

Figure 8:
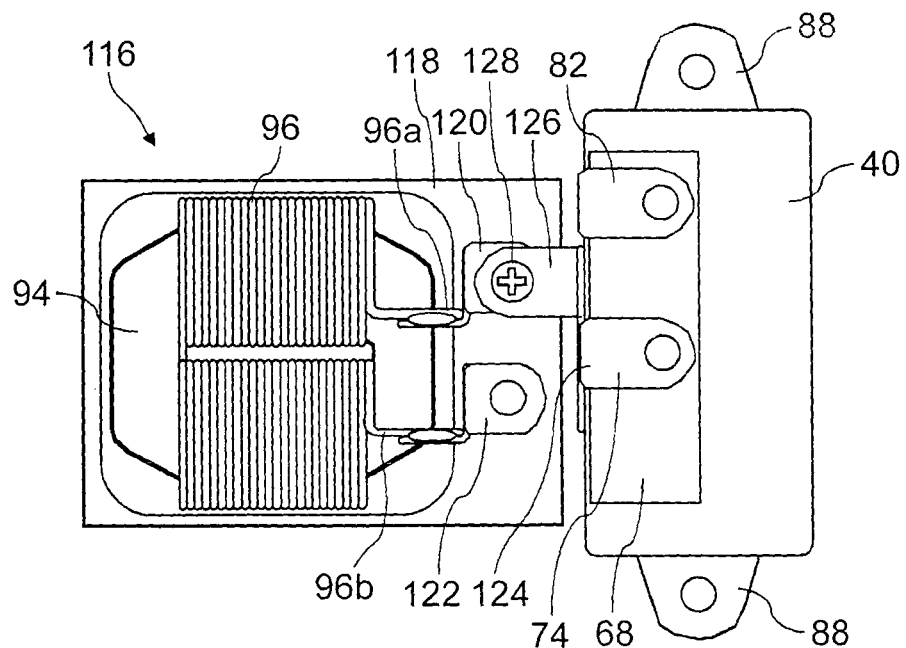
FIG. 8 is a view showing another manner of connection between the capacitor and the reactor, as a third modified example of the example embodiment.

As a third modified example of the example embodiment, the reactor and the capacitor may be connected by a bus bar as shown in FIG. 8. The core 94 and the winding 96 of a reactor 116 are similar to those of the example embodiment described above. The reactor 116 has a reactor case 118 that houses the core 94 and the winding 96, and also functions as a terminal block. Terminals, each of which is formed by a flat plate-shaped conductor, are provided on a portion of the reactor case 118 near the capacitor 40. These terminals will hereinafter be referred to as reactor terminals 120 and 122. The reactor terminals 120 and 122 are connected to the ends 96a and 96b of the windings, respectively, by welding or the like. The structure of a first positive wire 124 that extends from the positive plate to the first terminal block 68 differs from that of the first positive wire 72 in the example embodiment described above. The structure of a portion of the first positive wire 124 extending onto the first terminal block 68 is just as described above, with a tip end thereof forming the first positive terminal 74. On the other hand, the structure of a branch bus bar 126 that branches off from the portion extending onto the first terminal block 68 differs from that of the branch bus bar 98 described above. The branch bus bar 126 is formed by a flat metal plate that has been folded back. This branch bus bar 126 is folded back and extends to the reactor terminal 120, and is fixed together with the reactor terminal 120 to the reactor case 118 by a threaded fastening element such as a screw 128. A screw hole is provided in the reactor case 118. The screw 128 that passes through a hole in the branch bus bar 126 is screwed into this screw hole, such that the reactor terminal 120 and the branch bus bar 126 are fixed.

Here, aside from screw, the fastening element that fixes the branch bus bar 126 may also be a threaded bolt such as a hexagon bolt or a hexagon socket bolt. Also, a combination of a stud bolt and nut may also be used. The branch bus bar 126 may also be fixed to the reactor terminal 120 by welding. The branch bus bar 126 is a flat conductor plate, or more specifically, a metal plate. Also, the sectional shape of the branch bus bar 126 may also be an L-shape or a U-shape. Giving the branch bus bar 126 sufficient rigidity enables the capacitor 40 to be fixed to the reactor 116. The bus bar that fixes the capacitor 40 may also be an independent bus bar that extends between the first positive terminal 74 and the reactor terminal 120 may also be used, instead of branching off from the first positive wire 124. The capacitor 40 is fixed to the device case 62 indirectly via the reactor 116 by the branch bus bar 126 or the independent bus bar.

The capacitor may be fixed to both the reactor and the DC/DC converter, or only to the reactor. When the cradle 90 can only be provided in a position near the DC/DC converter 24 (low in FIG. 2) due to the layout of peripheral devices, it may be advantageous to fix the capacitor on the reactor side. Fixing the capacitor on the reactor side enables the fixing position to be away from the oscillation axis that is positioned low, thereby greatly inhibiting vibration.

Figure 9:
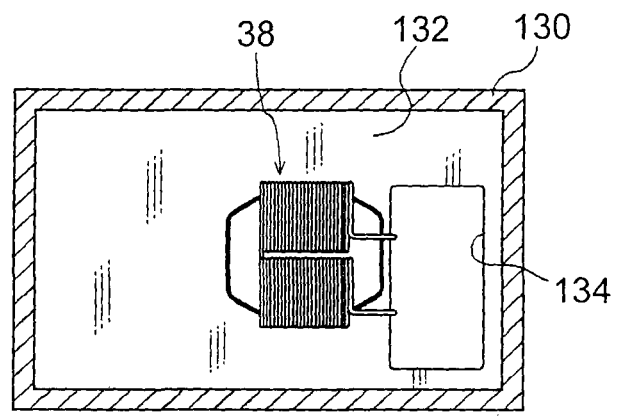
FIG. 9 is a view of an example of a schematic structure of an onboard device case according to the example embodiment.

FIG. 9 is a view of an example structure of a device case 130, and shows a state from the stacking direction of the DC/DC converter 24 and the reactor 38. A device case 130 has a partition wall 132 that divides the inside of the device case 130 in the stacking direction. A portion of the partition wall 132 is formed by the cooler case 60. The reactor 38 and the DC/DC converter 24 are arranged and fixed to the front and back, respectively, of the partition wall 132. An opening 134 for the capacitor 40 to pass through is provided in the partition wall 132. A portion of the capacitor 40 is positioned in the space on the reactor 38 side of the space that is divided by the partition wall 132, and the other portion of the capacitor 40 is positioned in the space on the DC/DC converter 24 side of the space that is divided by the partition wall 132. The partition wall 132 has reduced rigidity due to the opening 134 being formed in it. In addition, the reactor 38 that is heavy is fixed to the partition wall 132, so the resonant frequency may be decreased, and resonance may occur. The suppression of this resonance of the partition wall 132 will be described below.

Figure 10:
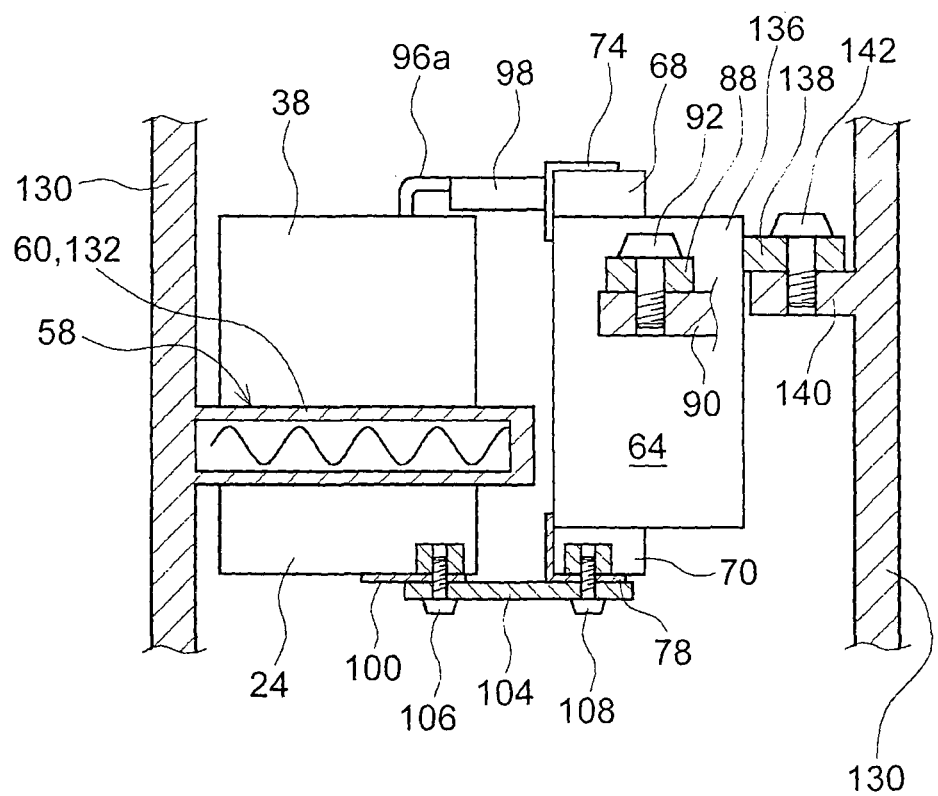
FIG. 10 is a view of another example arrangement of the reactor and the capacitor of the step-up transformer, and the step-down transformer, as a fourth modified example of the example embodiment.
Figure 11:
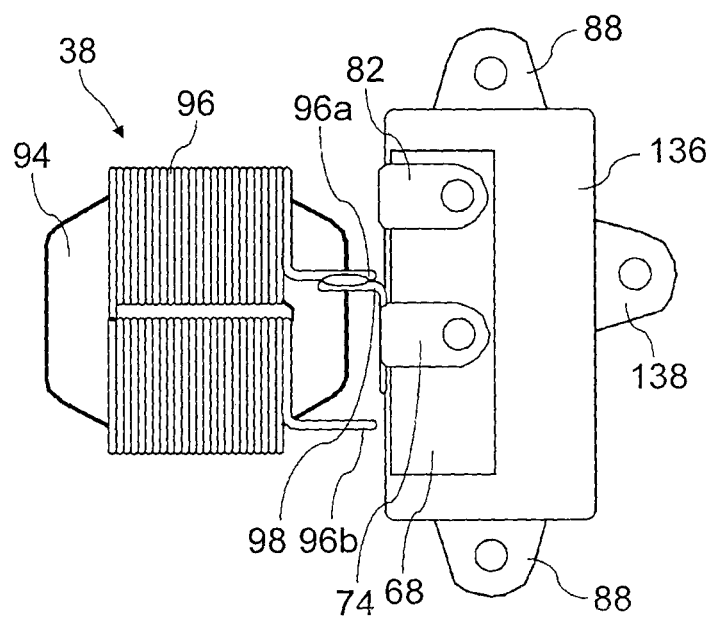
FIG. 11 is a view of an example in which there are three fixing points of the capacitor, as a fifth modified example of the example embodiment.

FIG. 10 is a view of a fourth modified example of the example embodiment as another mode related to fixing the capacitor to the device case. Also, FIG. 11, is a view of a fifth modified example. The fixing points where a capacitor 136 is fixed to the capacitor 40 is increased to three. The number of fixing points may also be greater than three. The other structure is the same as that of the capacitor 40, so a description thereof will be omitted. The capacitor 136 has a third fixing protrusion 138, in addition to the two fixing protrusions 88 like the capacitor 40. Hereinafter, the two fixing protrusions 88 described above will be referred to as first and second fixing protrusions 88. The third fixing protrusion 138 is provided on a side surface on a side opposite the side facing the reactor 38 or the DC/DC converter 24, i.e., on a side surface facing a side wall surface of the device case 130. A cradle 140 is provided on the device case 130 corresponding to this third fixing protrusion 138. The third fixing protrusion 138 is placed on the cradle 140, and fixed by a fastening element such as a threaded bolt 142 that passes through a hole provided in the third fixing protrusion 138. A screw hole is provided in the cradle 140, and the threaded bolt 142 is screwed into this screw hole. The point where the third fixing protrusion 138 is received by the cradle 140 is a third fixing point. This third fixing point is in a position away from a straight line that passes through fixing points in two locations related to the first and second fixing protrusions 88.

The bus bars 104 and 110 extend between the capacitor 136 and the 24 and join these together. As a result, opposite sides of the opening 134 in the partition wall are joined via the capacitor 136. The capacitor 136 is supported by fixing points in three locations not on the same straight line, so vibration is able to be suppressed more than when the capacitor 136 is supported by fixing points in two locations. As a result, vibration of the partition wall 132 to which the DC/DC converter 24 is fixed is able to be suppressed by joining the capacitor 136 and the DC/DC converter 24 together by the bus bars positive bus bar 104 and 110.

Also, similar to as is illustrated in the third modified example in FIG. 8, opposite sides of the opening 134 are joined via the capacitor 136 even with a structure in which the reactor 38 is joined to the capacitor 136 by the branch bus bar 126. In this case as well, the capacitor 136 in which vibration is suppressed is able to suppress vibration in the partition wall 132 to which the reactor 38 is fixed. The joining may be accomplished using either the bus bars 104 and 110 or the branch bus bar 126, or using both simultaneously.

The invention claimed is:

1. A power control unit that converts direct-current power to alternating-current power and supplies the converted power to an electric motor for driving a vehicle, the power control unit being fixed inside of an onboard device case, the power control unit comprising:
    a step-down transformer configured to step down voltage of the direct-current power; and
    a step-up transformer configured to step up voltage of the direct-current power, the step-up transformer including a reactor and a capacitor,
    the reactor and the step-down transformer being fixed to the onboard device case, and the reactor and the step-down transformer being vertically arranged,
    the capacitor being arranged next to at least one of the reactor or the step-down transformer, with respect to a direction in which the reactor and the step-down transformer are vertically arranged, and
    the capacitor and at least one of the step-down transformer or the reactor are configured to be fixed together by a bus bar so as to reduce vibrations due to varying magnetic field generated from a ripple current, the bus bar being configured to electrically connect a terminal of the capacitor to a terminal of at least one of the step-down transformer or the reactor, wherein the capacitor is fixed to the onboard device case at fixing points in two locations, and the bus bar fixes the capacitor to at least one of the step-down transformer or the reactor at a position away from a straight line that passes through the fixing points in two locations in a vertical direction, and wherein the bus bar extends in a direction that intersects a direction in which the straight line that passes through the fixing points in two locations of the capacitor extends, and the bus bar is a linear shaped flat plate-like conductor plate.

2. The power control unit according to claim 1, wherein a position where the capacitor is fixed by the bus bar is on a side opposite a side where the fixing points are positioned, in the vertical direction.

3. The power control unit according to claim 1, wherein the capacitor is fixed to the onboard device case at fixing points in three or more locations; and the onboard device case includes a partition wall that divides a space inside the onboard device case, an opening is provided in the partition wall, the capacitor passes through the opening, and at least one of the step-down transformer or the reactor is fixed to the partition wall.

4. The power control unit according to claim 3, wherein the step-down transformer and the reactor are fixed to a front and a back, respectively, of the partition wall.

5. The power control unit according to claim 1, wherein the bus bar fixes at least one of the step-down transformer or the reactor to the capacitor, and the step-down transformer and the reactor are fixed to a partition wall.

6. The power control unit according to claim 5, wherein the step-down transformer and the reactor are fixed to a front and a back, respectively, of the partition wall.

7. The power control unit according to claim 1, wherein the terminal of the capacitor and the terminal of the step-down transformer each include a positive terminal and a negative terminal; and the bus bar includes a positive bus bar and a negative bus bar, the bus bar connects the capacitor to the step-down transformer, the positive bus bar connects the positive terminals together, and the negative bus bar connects the negative terminals together.

8. The power control unit according to claim 1, wherein the capacitor includes a capacitor element, the capacitor element includes two electrode plates, an insulation member is arranged between the two electrode plates, and the two electrode plates are rolled into a roll shape, and a surface of the capacitor element is arranged facing the step-down transformer and the reactor, and the surface of the capacitor element is parallel to an axis of the roll of the electrode plates.

9. The power control unit according to claim 8, wherein a wire extending from the capacitor element to the terminal of the capacitor is arranged obliquely at an angle with respect to the axis of the roll of the electrode plates.

10. The power control unit according to claim 1, wherein the capacitor includes a capacitor element, the capacitor element includes two electrode plates, an insulation member is arranged between the two electrode plates, and the two electrode plates are rolled into a roll shape, and a surface of the capacitor element is orthogonal to an axis of the roll of the electrode plates.

11. The power control unit according to claim 10, wherein a wire extending from the capacitor element to the terminal of the capacitor is arranged obliquely at an angle with respect to the axis of the roll of the electrode plates.

12. The power control unit according to claim 1, wherein a cooler is sandwiched between the step-down transformer and the reactor.

13. The power control unit according to claim 1, wherein the capacitor is included in a capacitor case, at least one fixing protrusion extending from at least one surface of the capacitor case, and wherein the onboard device case further comprises at least one cradle configured to be fixed to the at least one fixing protrusion by a fastening element.

14. A power control unit that converts direct-current power to alternating-current power and supplies the converted power to an electric motor for driving a vehicle, the power control unit being fixed inside of an onboard device case, the power control unit comprising:

a step-down transformer configured to step down voltage of the direct-current power; and a step-up transformer configured to step up voltage of the direct-current power, the step-up transformer including a reactor and a capacitor, the reactor and the step-down transformer being fixed to the onboard device case, and the reactor and the step-down transformer being vertically arranged, the capacitor being arranged next to at least one of the reactor or the step-down transformer, and the capacitor and at least one of the step-down transformer or the reactor are configured to be fixed together by at least one bus bar so as to reduce vibrations due to varying magnetic field generated from a ripple current, the at least one bus bar being configured to electrically connect at least one terminal of the capacitor to at least one terminal of at least one of the step-down transformer or the reactor.

* * * * *